OPTICAL SCANNER CONVERTING ANALOG INTO DIGITAL EQUIVALENT

Filed Jan. 31, 1967

Erich Schwab
Inventor.

By Karl G. Ross
Attorney

Erich Schwab
Inventor.

By Karl F. Ross
Attorney

Erich Schwab
INVENTOR.
BY
Karl G. Ross
Attorney

United States Patent Office 3,436,757

Patented Apr. 1, 1969

3,436,757

OPTICAL SCANNER CONVERTING ANALOG INTO DIGITAL EQUIVALENT

Erich Schwab, Bad Munster, Germany, assignor to Jos. Schneider Feinwerktechnik, G.m.b.H., Bad Kreuznach, Germany, a corporation of Germany Filed Jan. 31, 1967, Ser. No. 612,947

Claims priority, application Germany, Feb. 17, 1966, Sch 38,509

Int. Cl. G02b 5/14; H01j 5/16

U.S. Cl. 340—347 10 Claims

ABSTRACT OF THE DISCLOSURE

Optical scanner for the conversion of an analog value, such as the physical dimension of an object to be measured, into its digital equivalent by means of a measuring bar which is illuminated by a light beam whose width in the longitudinal direction of the bar represents the analog value to be measured; the bar is composed of transverse sections alternately of relatively high light transmissivity (transparent or translucent) and of relatively low light transmissivity (e.g. opaque) which extend from the illuminated front face of the pulse to a rear face thereof along which an input of a photocell or similar photoelectric transducer is reciprocated to pick up luminous impulses for converting same into an electrical pulse train. As the transducer input sweeps along the bar, the length of the generated pulse train varies with the illuminated area of its front face and thus corresponds to the measured analog value which is represented in digital form by a preferably decadic pulse counter connected with the output of the transducer. The pulse counter may be controlled (e.g. reset to zero or stepped by one decade) by reference pulses of larger amplitude generated with the aid of two or more light sources shining upon spaced-apart light-conductive bar sections.

My present invention relates to an optical scanning system adapted to convert analog values, such as a projection of the physical dimensions of luminous or illuminated objects, into their digital equivalents for purposes or visual display and/or recording on paper, tape or other media.

In commonly assigned application Ser. No. 571,035, filed Aug. 8, 1966 by Rudolf Genähr and Kurt Brolde, there has been disclosed a system of this general type in which the analog information received (i.e. luminous energy from a beam of incident light) is conducted by a fiber-optical cable to a utilization circuit including a photoelectric transducer whose input is successively exposed, through the intermediary of a set of scanning conductors on a rotating disk, to the light impulses respectively transmitted by the constituent fibers of the cable. The transducer (e.g. photocell) thus produces a train of electrical pulses whose length is a measure of the width of the incident luminous field and, therefore, of the variable to be registered, this pulse train being fed to a pulse counter which controls a suitable indicator such as an oscilloscope. A scanning system of this type is especially useful where the object to be measured is not directly accessible (e.g. because of intense heat of susceptibility to damage upon contact) so that its dimensions can be determined most conveniently from the shadow it casts or from an image of its own radiant body.

The general object of my present invention is to provide a simplified system of this character which eliminates the need for having a wide multifiber optical cable extend from a measuring station to a conversion station.

A more particular object of my invention is to provide improved means in such system for indicating digital (e.g. decadic) subdivisions, in order to control (i.e. reset to zero or step to a new decade) a numerical counter responsive to the transducer output, and/or for comparing a measured analog value with a predetermined reference value.

In accordance with the present invention, I reduce the aforedescribed optical cable to a measuring bar composed of longitudinally adjoining transverse sections of alternately higher and lower light transmissivity, e.g. transparent or translucent sections alternating with opaque or nearly opaque sections, all these sections extending between a front face and an opposite rear face of the measuring bar. A photoelectric transducer has an input reciprocably mounted next to the rear face of the measuring bar so as to pick up a series of luminous impulses when a beam of light is focused upon part of the front face of the bar. These impulses are thus translated into a train of electrical impulses appearing in the output of the transducer, the length of that pulse train corresponding to the width of the incident luminous beam or field (as measured in the longitudinal direction of the bar) which in turn represents the analog value to be converted into digital terms. It is to be understood, in this connection, that such analog value may be a measure of the actual quantity of interest (e.g. the dimension of a luminous or illuminated object) or a measure of the complement of that quantity with reference to the total effective length of the bar, as where the object is nonluminous and casts its shadow upon a portion of the front face of the bar. In either case, the length of the illuminated portion of the measuring bar is reflected in the count registered by the pulse counter during each cycle of reciprocation of the transducer input along the rear face of the bar.

According to a more particular feature of my invention, selected light-transmissive sections of the measuring bar confront respective light sources which cause the appearance of larger-amplitude reference pulses in the output of the transducer. These reference pulses may be used to control the counter, by resetting its units denominational order to zero (with concurrent activation of the next-higher denominations order, if any) in the case of a decadic counter and/or by comparing its reading with a predetermined numerical value to indicate whether or not the same corresponds to the value actually measured. Thus, in a decadic multidigit counter to be stepped in this manner, the aforementioned light sources are to shine upon every tenth bar section of higher light transmissivity.

Advantageously, but not necessarily, the measuring bar is constructed in the same manner as the terminal portion of the fiber-optical cable of the aforementioned commonly owned application, i.e. as a stack of ribbon-shaped light conductors (each constituted by a planar array of fibers) interleaved with metal foils of substantially the same thickness; these metal foils may be wider than the adjoining fiber layers, their overhanging portions being separated by other, narrower metal foils having the same thickness as the fiber layers so that the resulting stack has a rectangular profile. It is, however, also possible to design the measuring bar as a rigid body of glass or other light-conductive material having dark zones painted thereon or imbedded therein. In any case, the input of the photoelectric transducer may comprise a planar layer of optical fibers having a width which substantially corresponds to that of any of the sections of higher and lower light transmissivity of the measuring bar.

The invention will be described in greater detail with reference to the accompanying drawing in which.

Figure 1:
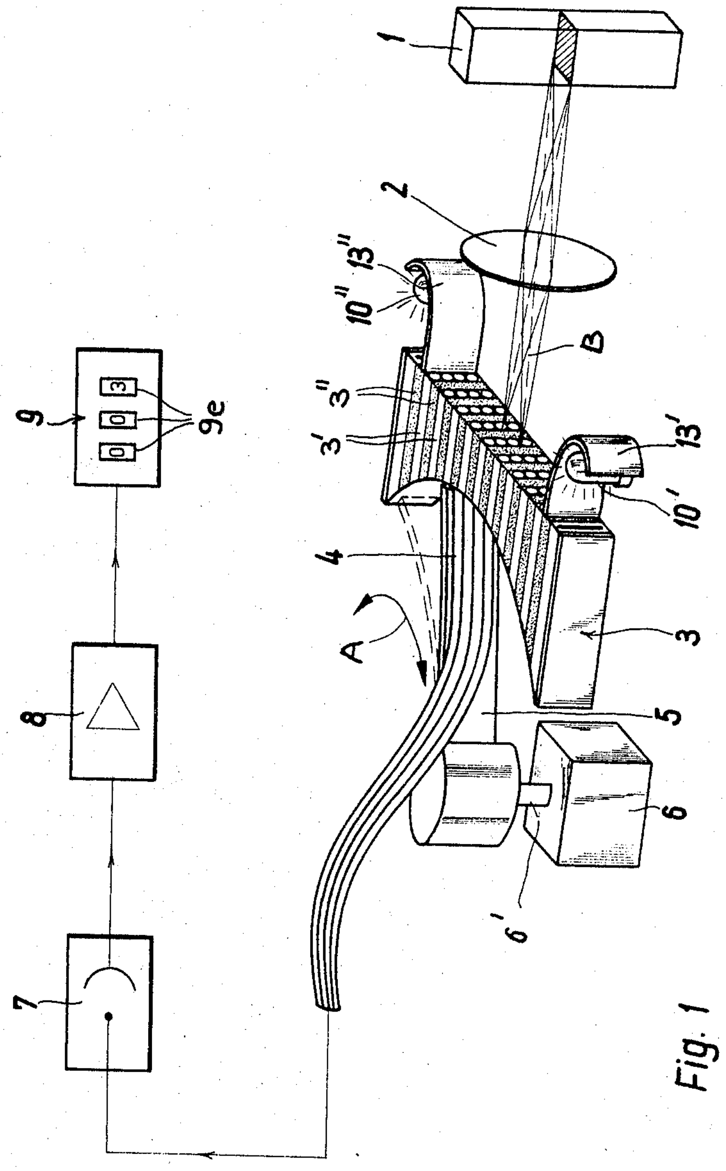
FIG. 1 is a partly diagrammatic view illustrating, in perspective, a measuring bar and adjoining elements of a system embodying the invention.

In FIG. 1 I have shown an object 1, e.g. a radiation emitter in the form of a red-hot steel ingot, whose image is focused by an objective 2 upon a measuring bar 3 consisting of relaitvely transparent transverse sections 3′ alternating with relatively opaque sections 3″. Sections 3′ are constituted by planar arrays of optical fibers stacked perpendicularly to the major dimension of the bar 3 and cemented onto the adjoining sections 3″ which may be metallic. As in the aforementioined copending application, the fibers of sections 3′ may have a diameter of about 50μ which may also be the thickness of each section 3″ so that a combined subdivision 3′, 3″ of the measuring bar has a width of 100μ corresponding to ten subdivisions per millimeter of length. In the drawing, for the sake of clarity, the thicknesses of sections 3′, 3″ have been greatly exaggerated with reference to the length of bar 3 and the dimensions of object 1.

Every tenth transparent section 3′ is illuminated by an individual triggering light source 10′, 10″ (only two shown) shielded by a section 13′, 13″ from the beam B of light rays focused upon the bar 3 by the objective 2; this illumination, therefore, is independent of the radiation emitted by the object 1. The extent of this beam, as projected upon the front face of measuring bar 3, is identical with (or, if desired, a predetermined multiple or fraction of) the dimension of interest, here the thickness of ingot 1. A reciprocable scanner 5, designed as an arm swingably mounted on the shaft 6′ of a vibrator 6, sweeps the rear face of bar 3 which is arcuately curved about that shaft. Arm 5 supports the input end of a fiber-optical cable 4 composed of a set of light-conducting plastic fibers, similar to those imbedded in sections 3′, the fiber array being flattened into a sharp edge in the immediate vicinity of bar 3. This sharp edge, of a width (e.g. 50μ) substantially equal to that of any section 3′ or 3″, thus moves close to the arcuate rear face of the bar in iterative sweeps as indicated by arrow A. During each sweep, cable 4 picks up a series of luminous impulses whose number corresponds to the number of sections 3′ illuminated by the beam B; at the beginning and at the end of the sweep, a more intense reference light pulse is communicated to the cable 4 by the triggering sources 10′ and 10″. Advantageously, the stacking of the fibers in cable 4 is identical with that in the sections 3′ so that these two sets of fibers register with each other whenever the input end of the cable confronts one of the sections 3′. In principle, however, the system would also operate if a lesser number of fibers (in fact, only a single fiber) were included in cable 4.

Figure 5:
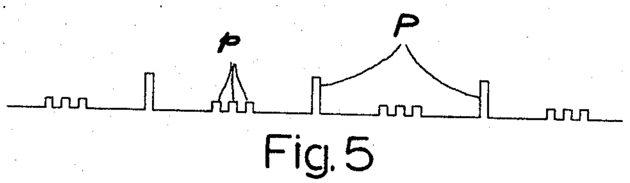
FIG. 5 is a graph illustrating a train of reference and measuring pulses produced by any of the systems shown in the preceding figures.
Figure 6:
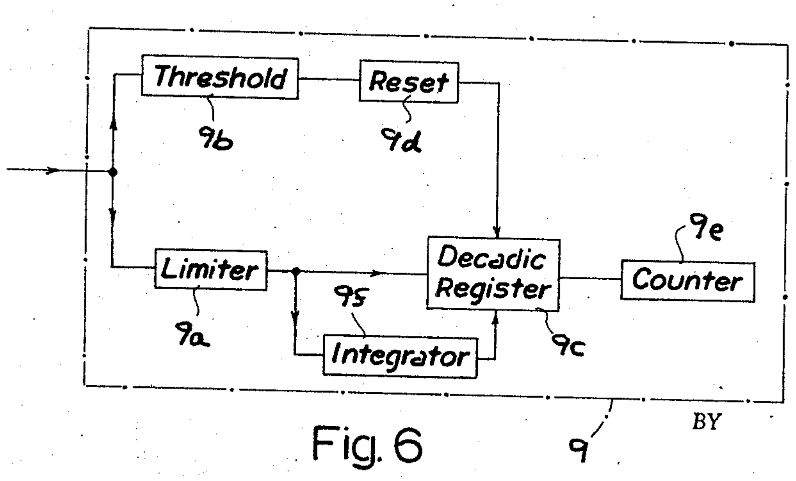
FIG. 6 is a circuit diagram of the output stage of the system shown in any of FIGS. 1–3.

The output end of cable 4, which in contradistinction to its flattened input end may be rounded by a rearrangement of the relative position of the fibers, confronts a photocell 7 which generates a train of electrical pulses *p*, FIG. 5, corresponding to the light impulses picked up at the illuminated region of measuring bar 3. Reference pulses P of larger amplitude are produced whenever the input end of cable 4 passes a section illuminated by one of the sources 10′, 10″. These pulses *p*, P are applied, by way of an amplifier 8, to a digital recording stage 9 shown in greater detail in FIG. 6. As illustrated in the latter figure, this stage comprises a limiter **9*a*** receiving the pulses *p*, P and, in parallel therewith, a threshold device **9*b* selecting only the larger pulses P; limiter 9*a* works into a decadic register 9*c* whose output sets a counter 9*e* (also seen in FIG. 1) and which is additionally controlled by a resetting circuit 9*d* responding to the pulses P from threshold device 9*b*. If only the terminal light sources 10′ and 10″ are provided, the reference pulses P merely reset the register 9*c* to zero at the end of each sweep; the counter 9*e* may respond to the information from register 9*c* with a certain inertia so as to give a continued reading of the final count registered in successive sweeps. If, on the other hand, the light sources 10′, 10″ are supplemented by similar light sources all following one another at ten-division intervals, the reference pulses P as received by circuit 9*b* may operate to step the register 9*c* and, thereby, the counter 9*e* through successive decades, with the reference pulses counted in the tens and higher denominational orders of the counter while the units denominational order is reset upon the arrival of each of these pulses; for this purpose, the output of limiter 9*a* may be fed to an integrator 9*f*** which inhibits the stepping of the counter upon termination of the pulse train *p*.

Figure 2:
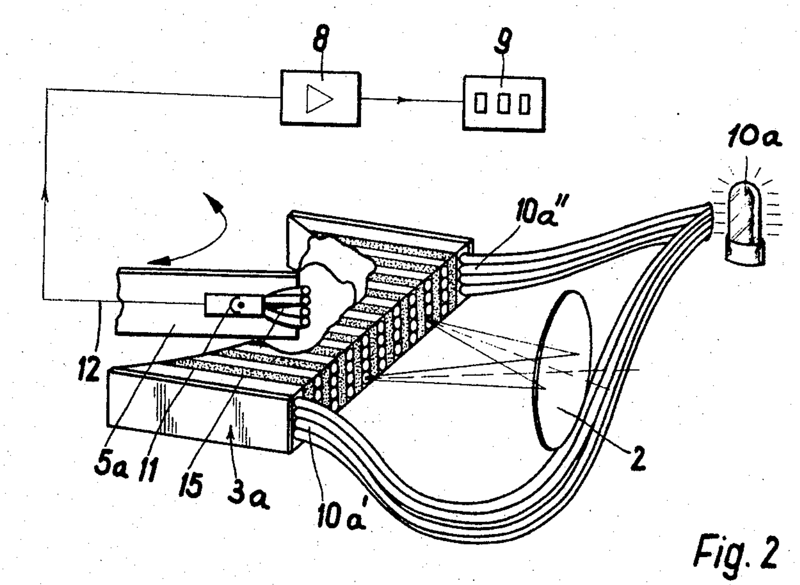
FIGS. 2 and 3 are views similar to FIG. 1, illustrating two other embodiments.

In FIG. 2 I have shown a measuring bar **3*a* which is generally identical with bar 3 of FIG. 1 but wherein the fibers of its terminal sections are integral with confronting fiber bundles 10*a*′, 10*a*″ forming branches of a flexible light-conducting cable (similar to cable 4 of FIG. 1) originating at a single light source 10*a*. The stationary transducer 7 of the previous embodiment has been replaced in FIG. 2 by a mobile photocell 11 carried on swingable arm 5*a*, the input of this photocell being constituted by a short fiber bundle 15 again flattened into a sharp edge at the curved rear face of bar 3*a*. A flexible lead 12 connects the output of photocell 15 to the input of amplifier 8**; the system operates otherwise in the same manner as that of FIG. 1.

Figure 3:
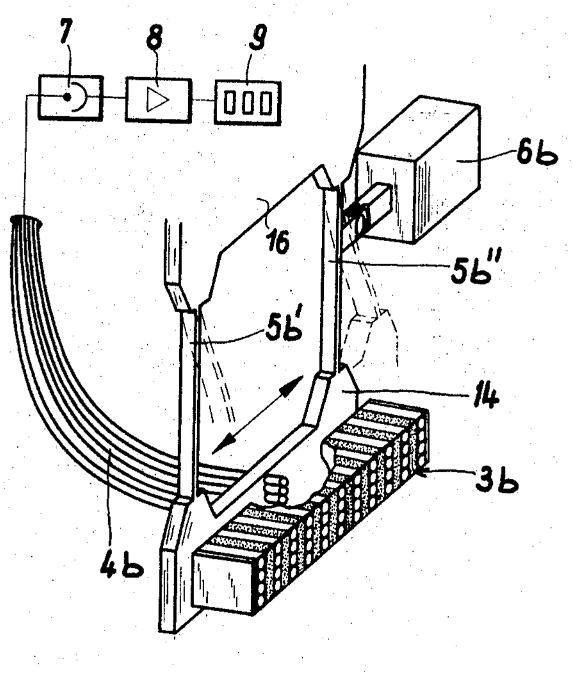

FIG. 3 illustrates a measuring bar **3*b* with a straight rear face confronted by the input end of a fiber-optical cable 4*b* similar to cable 4 of FIG. 1, this input end being supported on a rocker 14 which is suspended from a stationary frame 16 by a pair of leaf springs 5*b*′, 5*b*″ so as to reciprocate in a plane parallel to bar 3*b* under the control of a vibrator 6*b*. While the output circuit 7, 8, 9 in FIG. 3 is the same as in FIG. 1, it will be apparent that a mobile transducer (such as the photocell 11 of FIG. 2) could also be mounted on the rocker 14**.

Figure 4:
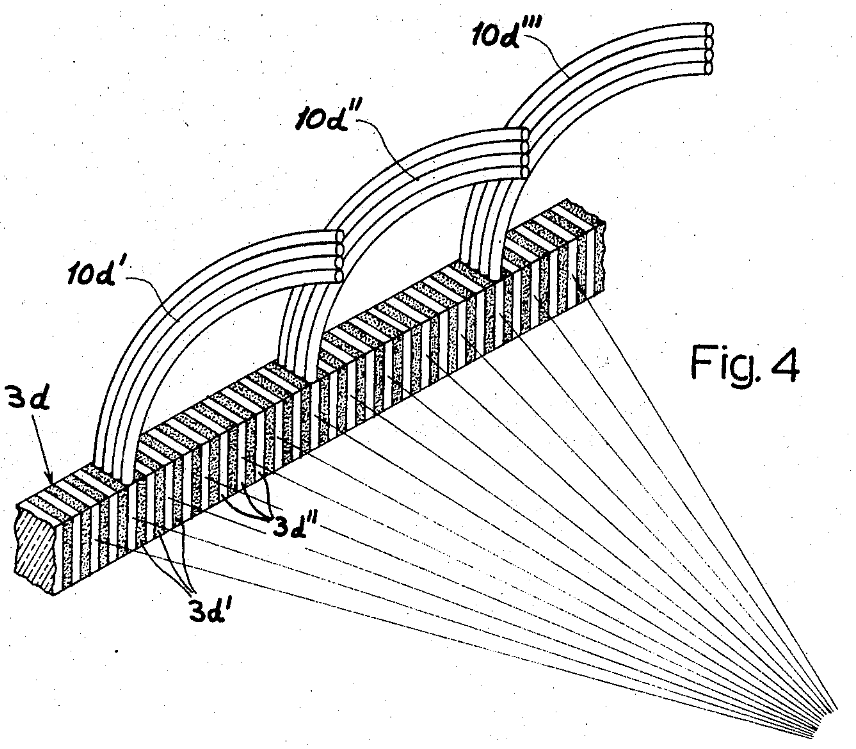
FIG. 4 is a fragmentary perspective view showing a modification of the arrangement of FIG. 2.

In FIG. 4, finally, I have shown a measuring bar **3*d* (here a glass rod with light and dark sections 3*d*′, 3*d*″) in which, within the field of illumination from an object not shown, a multiplicity of triggering light sources 10*d*′, 10*d*″, 10*d*‴ confront every tenth transparent bar section 3*d*′, these light sources being here of the type shown in FIG. 2 and consisting of optical cables whose fibers terminate nonobstructingly at the corresponding bar sections and which may be illuminated by a radiator or by individual radiation emitters. The arrangement of FIG. 4 is thus representative of a system in which, as described in connection with FIG. 6, reference pulses are generated to step a decadic counter instead of merely resetting it to zero at the end of each sweep. The sections 3*b*′ irradiated by cables 10*d*′** etc, may be coated at their front and bottom surfaces for internal reflection of the light rays toward the reciprocating scanner (not shown in FIG. 4).

The triggering light sources 10′, 10″ etc. described hereinabove may also be used to illuminate selected transparent bar sections whose mutual spacing corresponds to a predetermined design dimension, e.g. the thickness which an object 1 (FIG. 1) should have in order to pass inspection. In this case the circuit **9*c* in FIG. 6 may determine whether or not the beginning and the end of a pulse train from circuit 9*a* both coincide with the occurrence of a trigger pulse from circuits 9*b*, 9*d* and, dependent upon the presence or the absence of such coincidence, may operate the counter 9*e*** or a separate indicator circuit to give either a positive or a negative signal.

It is to be understood that the light rays impinging upon the measuring bar, from the object to be measured and/or from the triggering radiators, need not fall within the visible spectrum.

I claim:

1. An optical scanner for converting a measured analog value into its digital equivalent, comprising a measuring bar composed of longitudinally adjoining transverse sections of alternately higher and lower light transmissivity terminating at a front face and an opposite rear face of said bar spaced apart from said front face; a photoelectrical transducer having input means adjacent said rear face; drive means for iteratively reciprocating said input means across said rear face to pick up luminous impulses upon illumination of said front face by a beam whose width in the longitudinal direction of said bar is the analog of a variable to be measured where an electrical pulse train of a length corresponding to said width is generated in the output of said transducer; at least two light sources positioned to shine upon respective spaced-apart sections of higher light transmissivity of said bar for generating higher-amplitude reference pulses in said output; and pulse-counting means connected to said output for registering the digital equivalent of said width in response to said pulse train, said pulse-counting means including a register responsive to said reference pulses.

2. A scanner as defined in claim 1 wherein said light sources confront every tenth section of higher light transmissivity of said bar, said register being a decadic counter with a units denominational order resettable to zero by said control circuit upon the occurrence of any reference pulse.

3. A scanner as defined in claim 1 wherein said light sources include respective branches of at least one fiber-optical conductor originating at a common radiation emitter.

4. A scanner as defined in claim 1 wherein said input means comprises fiber-optical conductor means having a narrow end confronting said rear face and extending parallel thereto at right angles to the direction of reciprocation, each of said sections having a width substantially corresponding to that of said narrow end.

5. A scanner as defined in claim 4 wherein said conductor means is an array of light-conducting fibers with extremities aligned in one row at said narrow end.

6. A scanner as defined in claim 5 wherein said sections of higher light transmissivity consist each of a layer of light-conductive fibers registering with those of said narrow end upon operative alignment therewith.

7. A scanner as defined in claim 1 wherein said drive means comprises a vibrator operable to swing said input means about a fulcrum, said rear face being arcuately curved about said fulcrum.

8. A scanner as defined in claim 7 wherein said vibrator includes a spring arm with a fixed end remote from said rear face and a swingable end close to said rear face, said transducer being mounted on said spring arm.

9. A scanner as defined in claim 1 wherein said rear face is substantially planar, said drive means including a vibratory suspension for said input means swingable in a plane parallel to said rear face.

10. An optical scanner for converting a measured analog value into its digital equivalent, comprising a measuring bar composed of longitudinally adjoining transverse sections of alternately higher and lower light transmissivity terminating at a front face and an opposite, substantially planar rear face of said bar; a photoelectrical transducer having input means adjacent said rear face; drive means for iteratively reciprocating said input means across said rear face to pick up luminous impulses upon illumination of said front face by a beam whose width in the longitudinal direction of said bar is the analog of a variable to be measured where an electrical pulse train of a length corresponding to said width is generated in the output of said transducer, said drive means including a vibratory suspension for said input means swingable in a plane parallel to said rear face; and pulse-counting means connected to said output for registering the digital equivalent of said width in response to said pulse train; said input means comprising fiber-optical conductor means having a narrow end confronting said rear face and extending parallel thereto at right angles to the direction of reciprocation, each of said sections having a width substantially corresponding to that of said narrow end.

References Cited

UNITED STATES PATENTS

| | | | |
|---|---|---|---|
| 3,192,391 | 6/1965 | Ressler | 250—227 |
| 3,096,441 | 7/1963 | Burkhardt | 250—231 X |
| 3,173,018 | 3/1965 | Grim | 250—227 |
| 3,244,894 | 4/1966 | Steele et al. | 250—227 |
| 3,249,692 | 5/1966 | Clay et al. | 350—96 X |
| 3,330,964 | 7/1967 | Hobrough et al. | 250—231 X |
| 3,349,245 | 10/1967 | Hosker | 250—231 |
| 3,354,319 | 11/1967 | Loewen et al. | 250—237 X |

ROBERT SEGAL, *Primary Examiner.*

U.S. Cl. X.R.

250—227; 350—96